Patented July 21, 1953

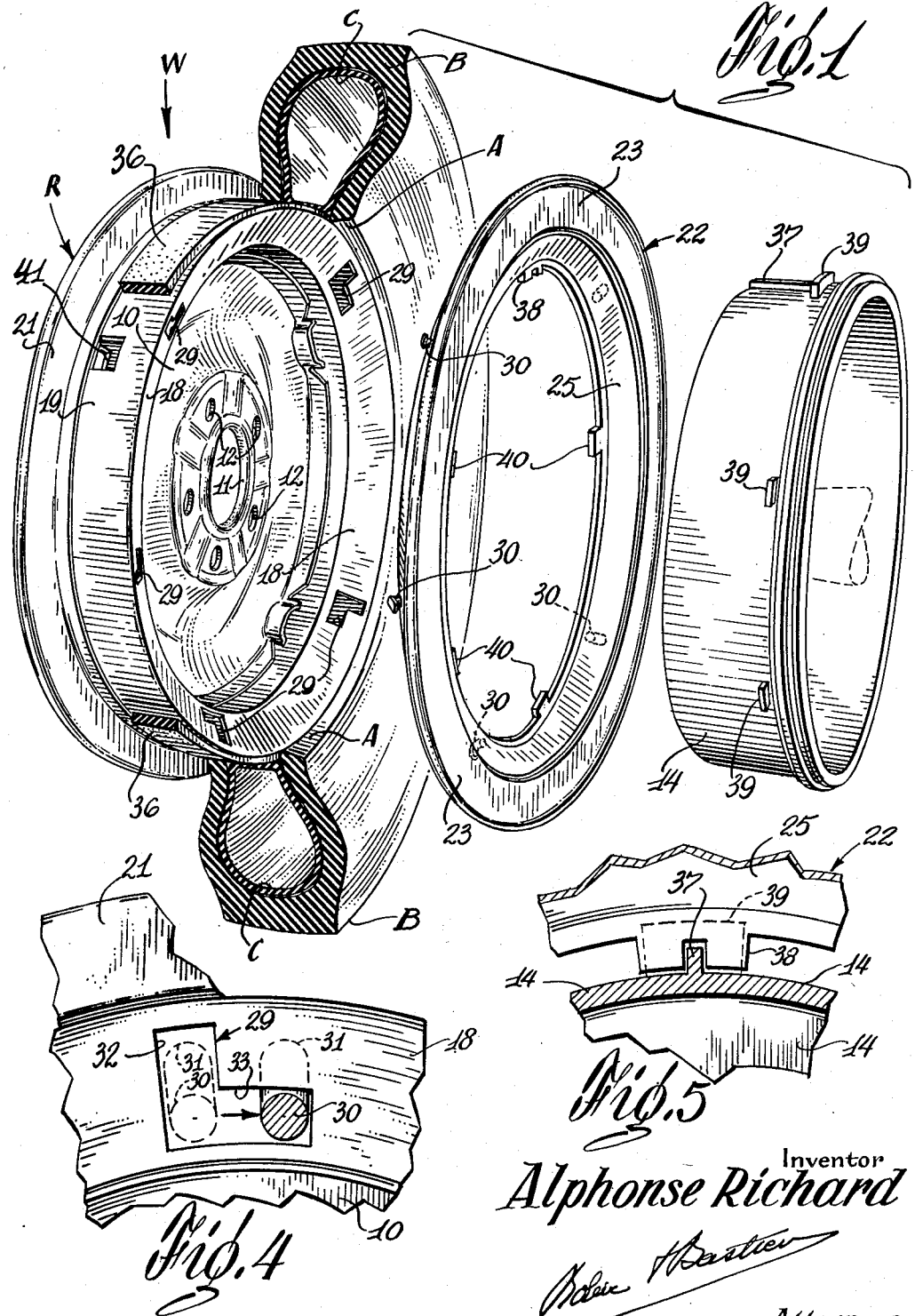

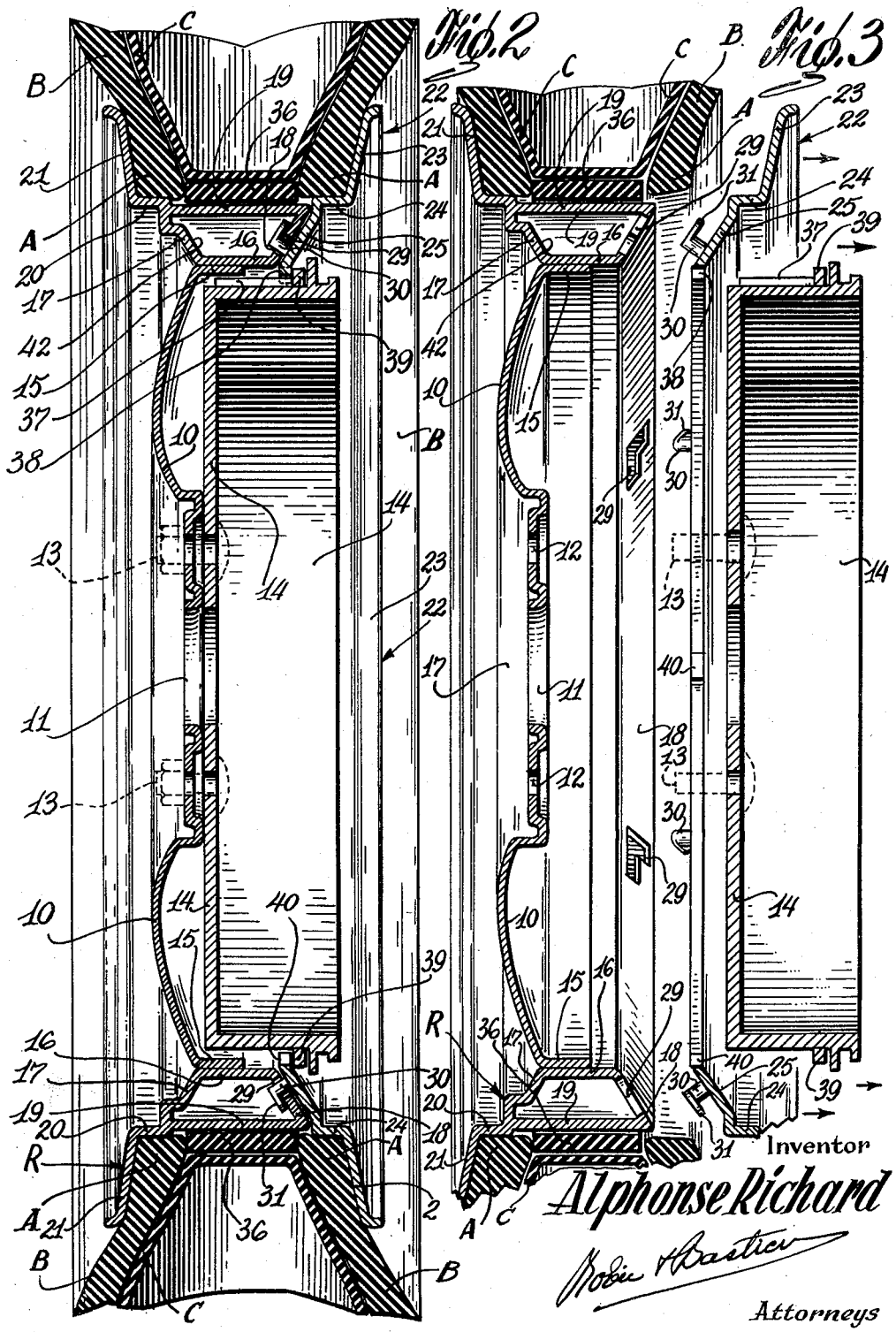

2,646,315

UNITED STATES PATENT OFFICE 2,646,315

AUTOMOTIVE TIRE WHEEL

Alphonse Richard, St. Thecle, Quebec, Canada, assignor of thirty-five per cent to Richard J. Veillet and fifteen per cent to Robert Cloutier, both of St. Thecle, Quebec, Canada Application August 3, 1951, Serial No. 240,122

4 Claims. (Cl. 301—6)

1

The present invention relates to automotive tire wheels and, more specifically, such wheels as are calculated to allow easy placement and removal of a pneumatic tire, but preventing jumping off of said tire under sudden deflation, or blow-out.

The automotive wheels currently used comprise almost exclusively a one-piece pressed steel rim formed with side flanges between which the mounted tire is retained. Obviously in this case, it would be impossible to mount a tire on such a rim unless means be provided for allowing passage of the tire over at least one flange. Those means generally include a "well," or depression, formed in the center of the rim and in which the bead of the tire is initially inserted, at one side, for permitting passage of the tire over the flange, at the other side. When inflated, the tire rests on "shoulders" provided on each side of the well.

This arrangement is perfectly satisfactory for the purpose noted above, and has been used on millions of automobiles; it suffers the great disadvantage, however, of allowing a mounted tire to jump off the wheel when, on the road, said tire blows out or is suddenly deflated. Under those conditions the tire often reverses, of itself, the mounting operations and leaves the wheel, with disastrous results. Countless fatal accidents have been traced to this occurrence alone.

The present invention has been conceived to avoid the disadvantage noted above by providing a wheel having no well in its rim and one removable side flange, for preventing self-removal of the tire and, yet, allow easy and most rapid placement, removal or servicing of same.

Consequently, the main object of the invention may be stated to reside in the provision of an improved automotive wheel in which a pneumatic tire is prevented from accidental removal.

Another important object of the invention concerns a wheel of the character noted above which, concurrently is an efficient, rugged, stable and safe structure.

A further object is the provision of a safety wheel which is simple, reliable in operation and the operating of which can be done without special tools or equipment.

Still another object contemplates a safety automotive wheel which for all its advantages can be manufactured at a cost comparable to ordinary wheels, its construction being substantially along the lines of the standardized current wheel production.

A still further object of the invention envisages an improved wheel construction which retains all the advantages of the ordinary pressed-steel wheel and can be interchanged at will with said ordinary wheels.

Other objects and advantages of the invention will be pointed out, or become immediately apparent, during the description to follow.

As an example of execution only, and for purposes of illustration, a possible embodiment of the invention is shown in the annexed drawings, wherein:

Fig. 1 is a composite, or montage, view of the wheel of the invention showing in perspective the constitutive elements of said wheel in relative disassembled position;

Fig. 2 is a section taken vertically through the wheel in assembled position and with the tire and inner tube in place;

Fig. 3 is a similar view but showing the wheel element disassembled;

Fig. 4 is an enlarged detail view of the rim ring locking means, and;

Fig. 5 is also an enlarged detail view illustrating the drum and ring co-inciding locking means for preventing lateral displacement of said ring.

Referring now to said drawings, wherein similar reference characters represent corresponding parts throughout, it will be seen that the wheel of the invention consists essentially of only two main parts: the wheel proper, that is: the side web and the felly with one flange; the removable side flange.

This is clearly depicted in Fig. 1 where a conventional steel disc wheel is represented generally by the letter W and consists of the web 10 having the usual center opening 11, for receiving the axle of the vehicle, and the circularly disposed holes 12 for receiving the bolts 13, see Figs. 2 and 3 normally permanently secured to the brake drum 14 of the vehicle.

The outer periphery of the web 10 is bent inwardly to form a cylindrical flange 15 secured to the inner cylindrical portion 16 of the rim. The latter has outer and inner inclined side portions 17 and 18 projecting from the cylindrical portion 16 and joined by an outer cylindrical portion 19 to form the felly of the wheel. Therefore this felly has a cross-section in the form of a trapezoid, the base of which is defined by the cylindrical portion 19. The side portion 17 is extended on the outer side of the wheel to form a tire bead receiving shoulder 20 and a flange 21 for respectively abutting the bead A and side of the tire B. The shoulder 20 projects somewhat from the cylindrical outer portion 19.

A detachable ring 22 forms the inner flange 23 of the wheel, to abut the inner side of the tire B. Said ring 22 forms also a tire bead receiving shoulder 24 and an inclined inner portion 25 adapted to contact the inclined portion 18 of the felly of the rim R.

The inclined portion 18 of the rim R is provided with circularly disposed, spaced L shaped key-ways 29 for receiving the registering circularly disposed studs 30 having a flat head 31 and secured to the inclined portion 25 of the ring 22. Said ring 22 is secured to the rim R by inserting the studs 30 into the transverse legs 32 of the L shaped key-ways 29 and rotating said ring 22 relatively to the wheel so as to cause the studs 30 to engage the circularly extending legs 33 of the key-ways 29, as shown in Fig. 4.

The mutually contacting inclined portions 18 and 25 of the rim R and the ring 22 respectively serve to center the latter relatively to the wheel W.

When the ring 22 is placed on the wheel W, the shoulder 24 of the former lies substantially at the same level as the shoulder 20 of the rim R, as shown in Fig. 2, so as to maintain the tire B in the proper assembled position.

A cylindrical band 36, preferably made of rubber or similar material, removably encloses the outer cylindrical portion 19 of the rim R, and has such a width as to extend between and abut the beads A of the tire B in order to maintain said tire in proper position especially when a flat tire occurs. This band 36 also prevents the inner tube C of the tire from becoming caught between the beads A and the rim R.

In order to prevent disengagement of the ring 22 from the wheel W by accidental rotational movement relatively to said wheel the brake drum 14 of the vehicle is provided with at least one longitudinally extending key 37 for engaging a U-shaped lug 38 projecting inwardly from the inner periphery of the ring 22.

As an additional safety measure for preventing accidental removal of the ring 22 from the wheel W, the brake drum 14 is provided at its outer surface with a row of outwardly projecting lugs 39 adapted to abut the corresponding inwardly projecting lugs 40 of the ring 22. One of the lugs 39 is aligned with the key 37 so as to abut the U-shaped lug 38 of the ring 22. Obviously the circle defined by the inner edge of the lugs 38 and 40 will have a diameter only slightly greater than the external diameter of the brake drum 14, to enable the mutual engagement of the key 37 and lugs 38, 39 and 40.

As seen in Fig. 1, the felly of the rim R is provided with registering apertures 41 for receiving the air valve of the inner tube C.

From the following description and referring more particularly to Fig. 2, it is seen that the conventional well 42 of the rim R of the wheel W is blocked completely by the outer portion 19 which prevents the beads A of the tire B from engaging said well 42; therefore, jumping off of the tire B from the wheel W is completely prevented especially when a blow out occurs.

On the other hand, a damaged tire is easily and promptly removed after removal of the wheel W from the brake drum 14 and removal of the ring 22 from the wheel W.

While a preferred embodiment according to the present invention has been illustrated and described, it is understood that various modifications may be resorted to without departing from the spirit and scope of the appended claims.

I claim:

1. In combination with a brake drum, an automotive tire wheel adapted to be removably secured to said brake drum, comprising a circular web, a rim secured to said web having a cylindrical outer peripheral portion substantially continuous transversely of the same, a flange projecting outwardly from said rim, a removable ring including an inner circular portion securable to said rim and an outer portion defining the other flange of said rim, and cooperating locking means on said brake drum and on said ring to prevent rotation of said ring relatively to said drum and to said wheel when the latter is secured to said drum and said ring secured to said rim, said cooperating locking means including a key secured longitudinally on said brake drum and a registering U-shaped lug projecting inwardly from the inner periphery of said ring.

2. The combination as claimed in claim 1, wherein said rim includes an inner annular side portion inwardly inclined relatively to said cylindrical outer portion and the inner circular portion of said ring being inclined to contact said annular side portion of said rim when secured to the latter.

3. The combination as claimed in claim 2, further including circularly disposed L-shaped key ways made through said inclined annular side portion of said rim and registering studs projecting from said inner circular portion of said ring and engageable with said L-shaped key-ways.

4. In combination with a brake drum, an automotive tire wheel to be secured to said vehicle brake drum, comprising a web, a felly of trapezoidal cross-section secured to the periphery of said web with its base facing outwardly, a flange projecting outwardly from said base of said felly at the outer side face of said wheel to engage and contact the outer side of the tire, a removable ring securable to said felly, said ring comprising a flange for contacting the inner side face of the tire and an inwardly projecting annular inclined portion contacting the inner inclined side portion of said felly, L-shaped key-ways made in said inclined portion of said felly, studs projecting from said inner inclined portion of said ring and engageable with said L-shaped key-ways, a circular band having a width slightly smaller than the width of the base of said felly and removably surrounding the same to maintain the beads of said tire in spaced apart relationship, means to prevent rotational movement of said ring relatively to the brake drum, comprising a longitudinal key projecting from and secured to said brake drum and a U-shaped lug projecting inwardly from the inner periphery of said ring and engageable with said key, and means to prevent removal of said ring from said felly comprising spaced apart circularly disposed lugs projecting from the outer face of said brake drum and cooperating inwardly projecting lugs projecting from the inner periphery of said ring adapted to abut the lugs on said drum.

ALPHONSE RICHARD.

References Cited in the file of this patent

UNITED STATES PATENTS

| Number | Name | Date |
|---|---|---|
| 1,463,291 | Mundy | July 31, 1923 |
| 1,465,714 | Kaplan | Aug. 21, 1923 |
| 1,609,878 | Liddell | Dec. 7, 1926 |
| 2,001,242 | Dodge | May 14, 1935 |
| 2,354,437 | Hale | July 25, 1944 |
| 2,400,930 | Herzegh | May 28, 1946 |